(12) United States Patent
Mori et al.

(10) Patent No.: US 8,724,767 B2
(45) Date of Patent: May 13, 2014

(54) METHOD OF REMOVING RETAINER OF JET PUMP AND JET PUMP

(75) Inventors: Hajime Mori, Yokohama (JP); Kunihiko Kinugasa, Yokohama (JP); Yukiaki Hidaka, Isehara (JP); Masaru Ukai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/489,146

(22) Filed: Jun. 5, 2012

(65) Prior Publication Data

US 2012/0240397 A1 Sep. 27, 2012

Related U.S. Application Data (63) Continuation of application No. 12/699,624, filed on Feb. 3, 2010, now abandoned, which is a continuation of application No. 11/781,524, filed on Jul. 23, 2007, now abandoned.

(30) Foreign Application Priority Data

Jul. 24, 2006 (JP) ................................. 2006-200618

(51) Int. Cl.
*G21C 19/00* (2006.01)
*G21C 15/00* (2006.01)
*F04F 5/00* (2006.01)
*G21C 19/20* (2006.01)
*G21C 15/25* (2006.01)

(52) U.S. Cl.
CPC .............. *G21C 19/207* (2013.01); *G21C 15/25* (2013.01)

USPC ........... 376/260; 376/372; 376/407; 417/173; 417/151

(58) Field of Classification Search
CPC .............................. G21C 19/207; G21C 15/25
USPC ................ 417/151, 173; 29/888.02, 888.021; 376/260, 372, 407; 83/745
See application file for complete search history.

(56) References Cited

U.S. PATENT DOCUMENTS

| | | | |
|---|---|---|---|
| 3,154,140 A | | 10/1964 | Esselman, et al. |
| 3,378,456 A | * | 4/1968 | Roberts .......................... 376/407 |
| 3,389,055 A | | 6/1968 | Hughes |
| 4,043,705 A | | 8/1977 | Schlosser |
| 4,233,116 A | | 11/1980 | Mangus |
| 4,292,130 A | * | 9/1981 | Viaud et al. .................... 376/262 |
| 4,377,551 A | * | 3/1983 | Adams ........................... 376/260 |
| 4,383,394 A | * | 5/1983 | Qurnell et al. .................. 451/58 |
| 4,406,047 A | * | 9/1983 | Jeffers et al. .................. 29/426.5 |
| 4,468,172 A | | 8/1984 | Dixon et al. |

(Continued)

FOREIGN PATENT DOCUMENTS

| | | |
|---|---|---|
| JP | 58-14093 | 1/1983 |
| JP | 59-64299 | 4/1984 |

(Continued)

*Primary Examiner* — Charles Freay
*Assistant Examiner* — Alexander Comley
(74) *Attorney, Agent, or Firm* — Oblon, Spivak, McClelland, Maier & Neustadt, L.L.P.

(57) ABSTRACT

A retainer provided at lower portion of a pump beam of a jet pump for circulating cooling water to a reactor core or a bolt for fastening the retainer is cut through an underwater-remote control to remove the bolt and the retainer is removed through the underwater-remote control.

1 Claim, 10 Drawing Sheets

33

(56) References Cited

U.S. PATENT DOCUMENTS

| | | | |
|---|---|---|---|
| 4,499,691 A * | 2/1985 | Karazim et al. | 451/439 |
| 4,522,780 A * | 6/1985 | Shallenberger et al. | 376/260 |
| 4,673,545 A * | 6/1987 | Cooke et al. | 376/261 |
| 4,675,149 A * | 6/1987 | Perry et al. | 376/260 |
| 4,699,754 A | 10/1987 | French | |
| 4,995,158 A * | 2/1991 | Howell et al. | 29/723 |
| 5,070,589 A * | 12/1991 | Howell et al. | 29/426.5 |
| 5,377,238 A * | 12/1994 | Gebelin et al. | 376/260 |
| 5,478,208 A | 12/1995 | Kasai et al. | |
| 5,515,407 A * | 5/1996 | Bevilacqua et al. | 376/372 |
| 5,687,206 A | 11/1997 | Schmidt et al. | |
| 5,689,537 A * | 11/1997 | Hahn | 376/260 |
| 5,690,005 A * | 11/1997 | Jung et al. | 81/57.3 |
| 5,752,807 A | 5/1998 | Erbes | |
| 5,964,029 A | 10/1999 | Weems et al. | |
| 6,108,391 A * | 8/2000 | Deaver et al. | 376/262 |
| 6,394,765 B1 | 5/2002 | Erbes et al. | |
| 6,434,208 B1 * | 8/2002 | Erbes et al. | 376/260 |
| 6,435,839 B1 | 8/2002 | Erbes | |
| 6,450,774 B1 | 9/2002 | Erbes et al. | |
| 6,490,331 B2 | 12/2002 | Erbes | |
| 6,633,623 B2 | 10/2003 | Dulka et al. | |
| 6,715,201 B2 | 4/2004 | Sato et al. | |
| 6,817,837 B2 | 11/2004 | Hutchinson et al. | |
| 6,865,243 B2 * | 3/2005 | Paillaman et al. | 376/245 |
| 2002/0106281 A1 | 8/2002 | Erbes et al. | |

FOREIGN PATENT DOCUMENTS

| | | | |
|---|---|---|---|
| JP | 60-47993 | 3/1985 | |
| JP | 2004-219102 | 8/2004 | |
| JP | 2004219102 A * | 8/2004 | G21C 19/02 |

* cited by examiner

METHOD OF REMOVING RETAINER OF JET PUMP AND JET PUMP

CROSS-REFERENCE TO RELATED APPLICATION

This application is a continuation of and claims the benefit of priority under 35 U.S.C. §120 from U.S. Ser. No. 12/699,624 filed Feb. 3, 2010, which is a continuation of U.S. Ser. No. 11/781,524 filed Jul. 23, 2007, the entire contents of which are incorporated herein by reference. U.S. Ser. No. 11/781,524 filed Jul. 23, 2007 claims the benefit of priority under 35 U.S.C. §119 from Japanese Patent Application No. 2006-200618 filed Jul. 24, 2006.

BACKGROUND OF THE INVENTION

1. Field of the Invention

The present invention relates to a method of removing a retainer of a jet pump and also relates to a jet pump after removal of the retainer, the method being for removing the retainer of a jet pump provided in a reactor pressure vessel of a boiling water reactor to circulate a cooling water to a reactor core or for removing a bolt for fastening the retainer.

2. Related Art

Conventionally, a so-called jet pump system combining a recirculating pump disposed outside a reactor pressure vessel and jet pumps provided in the reactor pressure vessel is employed in a boiling water reactor so as to increase power density.

As a method of carrying out forced circulation of reactor coolant to a reactor core portion of the reactor pressure vessel as cooling water in the boiling water reactor, there are provided an outside recirculation system and an inside recirculation system. The outside recirculation system includes a plurality of jet pumps disposed in the reactor pressure vessel and a recirculating pump disposed outside the reactor pressure vessel. The jet pumps serve to form cooling water sent from the recirculating pump into jet streams and forcibly send the cooling water from a reactor core lower plenum below a reactor core portion to the reactor core portion while taking in the reactor water around the jet pumps to thereby carry out the forced recirculation of the reactor coolant in the reactor pressure vessel. The jet pump of the boiling water reactor employing this jet pump system will be described hereunder with reference to FIGS. 9 to 12.

Figure 9:
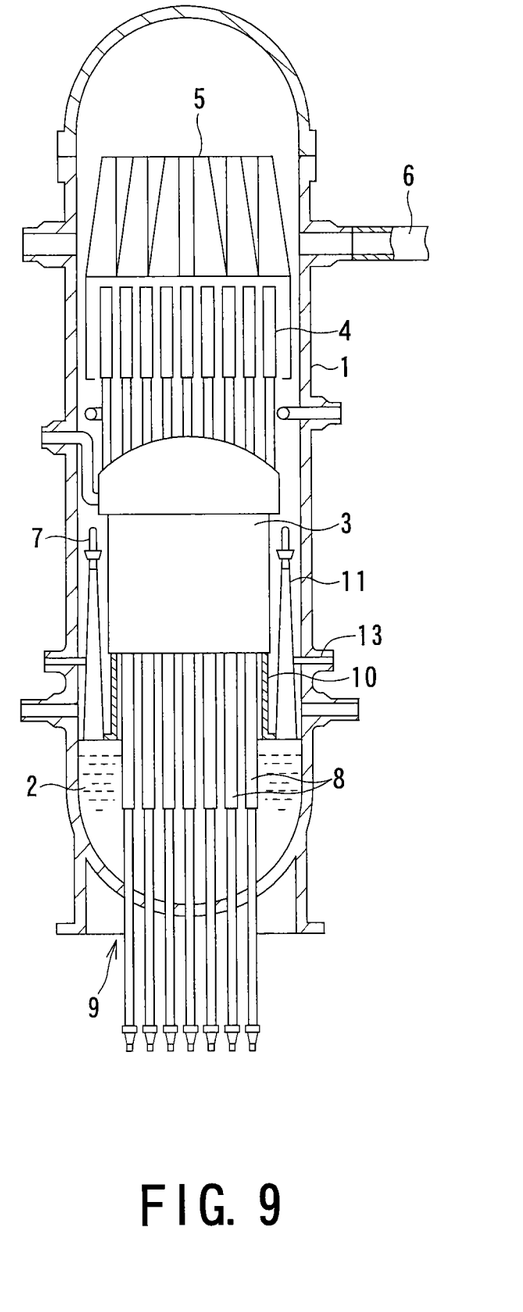
FIG. 9 is a view showing an overall structure of a boiling water reactor.

FIG. 9 is a vertical cross-sectional view schematically showing a structure of the boiling water reactor. As shown in FIG. 9, reactor coolant 2 and a reactor core 3 are housed in a reactor pressure vessel 1. The reactor core 3 is formed of a plurality of fuel assemblies, control rods, and the like, not shown, and is housed in a core shroud 10.

The reactor coolant 2 circulates upward through the reactor core 3. At this time, the reactor coolant 2 constitutes a two-phase flow of water and steam as its temperature is increased by nuclear reaction heat of the reactor core 3. The coolant 2 in the state of the two-phase flow flows into a steam-water separator 4 disposed above the reactor core 3 and is separated into water and steam there. The steam is then introduced into a steam dryer 5 disposed above the steam-water separator 4 and becomes dry steam.

The dry steam is transferred to a steam turbine, not shown, through a main steam pipe 6 connected to the reactor pressure vessel 1 and is used for electric power generation. On the other hand, the separated water flows through a downcomer portion 7 between the reactor core 3 and the reactor pressure vessel 1 and flows down below the reactor core 3. Control rod guide tubes 8 are disposed below the reactor core 3 and control rods are inserted into or withdrawn from the reactor core 3 through the control rod guide tubes 8.

A control rod drive mechanism 9 is disposed under the control rod guide tubes 8 and controls insertion and withdrawal of the control rods into and from the reactor core 3. In the downcomer portion 7, a plurality of jet pumps 11 are arranged with a space uniformly in a circumferential direction.

On the other hand, a recirculating pump, not shown, is disposed outside the reactor pressure vessel 1. The recirculating pump, the jet pumps 11, and recirculation piping disposed therebetween constitutes a recirculation system. The recirculating pump feeds drive water to the jet pumps 11 and forced circulation of the coolant 2 into the reactor core is carried out by the action of the jet pumps 11.

Figure 10:
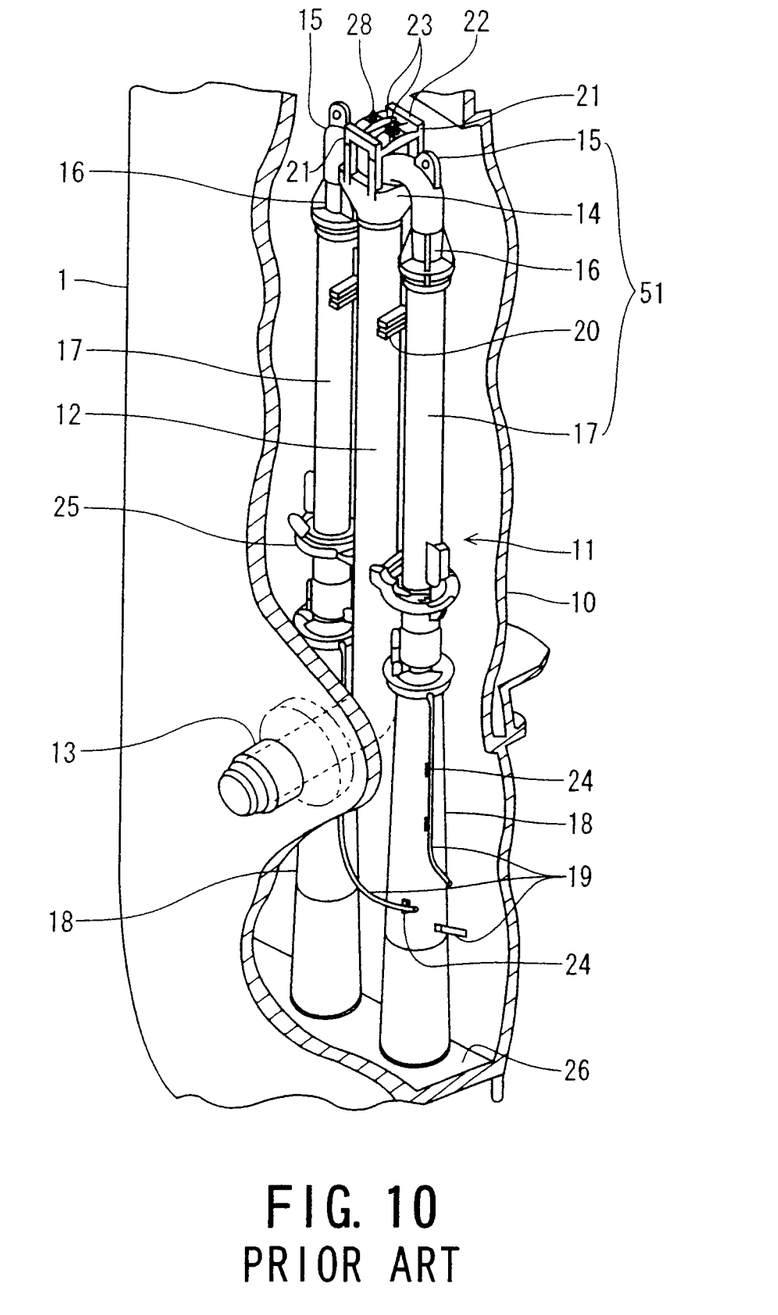
FIG. 10 is a schematic view showing a structure of a jet pump.

FIG. 10 is an enlarged view of an essential portion of FIG. 9. As shown in FIG. 10, the jet pumps 11 have a riser pipe 12. The riser pipe 12 is fixed to the reactor pressure vessel 1 through a riser place 20 and introduces the coolant 2 fed from a recirculation inlet nozzle 13 of the recirculating pump into the reactor.

A pair of elbows 15 are connected to an upper portion of the riser pipe 12 through a transition piece 14. Inlet throats 17 are respectively connected to the elbows 15 through mixing nozzles 16. The paired inlet throats 17 are respectively connected to diffusers 18. The mixing nozzles 16 jet the coolant 2, the reactor water around the nozzles 16 is taken in at this time, and the jetted coolant 2 and the taken water are mixed in the inlet throats 17. The elbow 15, the mixing nozzle 16, and the inlet throat 17 are integral with each other so as to form an inlet mixer 51.

By the way, in the above structure, fluid oscillation occurs due to the flow sent in from the recirculating pump in cooling. In order to cope with the fluid oscillation, a lower end of the riser pipe 12 is welded to the recirculation inlet nozzle 13 and an upper end of the riser pipe 12 is fixed to the reactor pressure vessel 1 through the riser place 20 as described above. The diffusers 18 are fixed to a baffle plate 26 welded to the reactor pressure vessel 1.

Upper ends of the inlet throats 17 are mechanically connected to the transition piece 14 through the mixing nozzles 16 and the elbows 15, and the lower ends of the inlet throats 17 are inserted into upper ends of the diffusers 18. In this way, the riser pipe 12 and the inlet mixers 51 have such structures as to be able to sufficiently cope with the fluid oscillation.

Next, a structure above the mixing nozzles 16 will be described. On opposite sides of the transition piece 14, a pair of ear portions 21 are formed, respectively. These ear portions 21 protrude upward, and groove portions 22 are formed on inner sides of upper end portions of the ear portions 21. A pair of jet pump beams 23, each having a rectangular section increasing in size toward a longitudinal center portion, are fixed to the groove portions 22 with their opposite end portions fitted in the groove portions 22.

Figure 11:
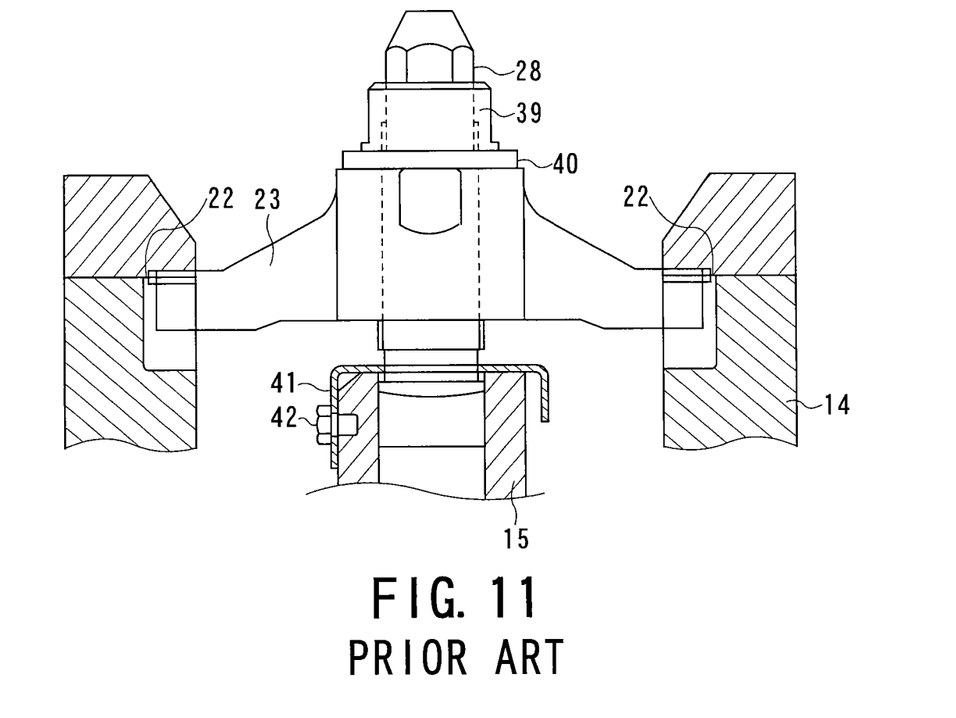
FIG. 11 is a view showing an assembled structure of a jet pump beam.
Figure 12:
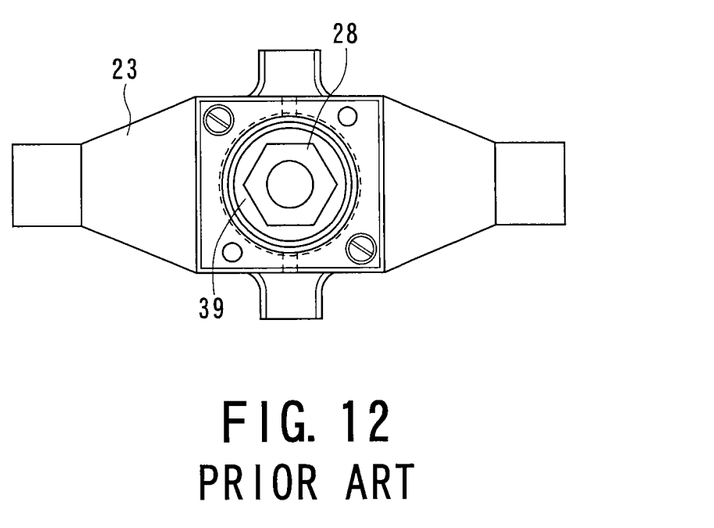
FIG. 12 is a plan view of FIG. 11.

FIG. 11 is a side view showing a fitted state of the jet pump beam 23 and FIG. 12 is a plan view of FIG. 11. As shown in these drawings, a screw hole is formed in a vertical direction at the center of the jet pump beam 23. In the screw hole, a head bolt 28 is screwed. A hexagon head is formed at an upper end of the head bolt 28, and a hemispherical head is formed at a lower end. On the other hand, the elbow 15 is formed with a mount portion having a horizontal upper end surface and the mount portion is formed with a counterbored hole. In the counterbored hole, the hemispherical head of the head bolt 28 is fitted through a spherical washer.

The inlet mixer 51 is not secured to the reactor pressure vessel 1, and therefore, the inflow water pressure of the drive water fed through the riser pipe 12 acts on the upper end portion of the inlet mixer 51. Moreover, the reaction force to the jet water pressure of the drive water jetted from the mixing nozzle 16 into the diffuser 18 also acts upward. In order to resist such load, the head bolt 28 may be screwed into the jet pump beam 23.

Since the ear portions 21 are fixed in fixed positions, when the head bolt 28 is screwed down, the jet pump beam 23 is moved upward, and the opposite ends of the jet pump beam 23 come in contact with the upper wall surfaces of the groove portions 22. In this way, an upward load is received.

On the other hand, a downward load is applied to an upper end portion of the elbow 15 through the head bolt 28, and magnitude of the load is determined by a relationship with the upward load due to the reaction force and the like of the drive water. A keeper 39 is detachably fitted over the hexagon head of the head bolt 28. The keeper 39 is secured onto a plate 40 by means of spot welding. The plate is in a square shape and is fixed to an upper surface of the jet pump beam 23 by means of two bolts.

A retainer 41 is fixed, below the head bolt 28, to the elbow 15 by a retainer mounting bolt 42 so that the inlet mixer 51, the head bolt 28, and the jet pump beam 40 can be handled as an integral body in removing the inlet mixer 51.

Incidentally, as the reactor operates, high-frequency oscillation is applied to the retainer 41 due to vane passing pulsation of the recirculating pump for recirculating the reactor coolant. The retainer 41 may lose its retaining force due to initial looseness of the retainer mounting bolt 42 or permanent set of the retainer 41 during the operation to come in contact with members therearound and wear away due to the oscillation caused by the circulation of the coolant. If this wearing proceeds, the retainer 41 may fall down into the reactor to cause damage fatal to the operation of the rector.

Conventionally, there is proposed a method of replacing a part in which a retainer is deformed by using a jig operated from a side of a jet pump top portion (e.g., Japanese Patent Application Laid-open NO. 8-201566).

Further, the retainer 41 has a function of fixing the head bolt 28 to the elbow 15 in removing the inlet mixer 51 after starting the operation of the reactor. If the retainer 41 is not installed during the normal operation, no functional problem will be caused. On the contrary, if the retainer 41 and the retainer mounting bolt 42 are damaged after the starting of the operation of the reactor, they may constitute falling objects.

Since an area around the retainer 41 and the retainer mounting bolt 42 becomes an environment of high-dose radiation due to irradiation of nuclear fuel, it is difficult to directly remove the retainer 41 and the retainer mounting bolt 42. Therefore, in order to obtain sufficient shielding effect of water, the retainer 41 need to be removed through an underwater-remote control operation. However, conventionally, there is no known method of detachment under such an environment that sufficient shielding effect of water is obtainable.

SUMMARY OF THE INVENTION

The present invention was conceived in consideration of the circumstances mentioned above, and an object of the invention is to provide a method of removing a jet pump retainer for easily carrying out a recovery work for securing a sufficient function of a jet pump and for removing the retainer under such an environment that sufficient shielding effect of water can be effected in order to minimize exposure of a worker to radiation.

It is another object of the present invention to provide a jet pump after removal of the retainer by the above method.

To achieve the above object, there is provided a method of removing a jet pump retainer, the method including the steps of cutting the retainer or a bolt for fastening the retainer through an underwater-remote control to remove the bolt and removing the retainer, through an underwater-remote control, disposed to a lower portion of a pump beam of a jet pump provided in a reactor pressure vessel of a boiling water reactor to circulate cooling water to a reactor core.

To achieve the other object, there is provided a jet pump including a riser, a diffuser, and an inlet mixer positioned between the riser and the diffuser and provided in a reactor pressure vessel of a boiling water reactor having a retainer disposed for handling a jet pump beam and a head bolt for connecting the inlet mixer and the riser by fastening as an integral body, the jet pump circulating cooling water to a reactor core, wherein the retainer provided to a lower portion of the pump beam of the jet pump or a bolt for fastening the retainer is cut through an underwater-remote control to remove the bolt and the retainer is removed through an underwater-remote control.

According to the present invention having the above features, recovery work for securing a sufficient function of a jet pump can be carried out easily, and the retainer can be removed under such an environment that sufficient shielding effect of water is obtained in order to minimize exposure of a worker to radiation.

DESCRIPTION OF THE PREFERRED EMBODIMENTS

Embodiments of the present invention will be described hereunder with reference to FIGS. 1 to 8. Like reference numerals are added to members or portions corresponding to those in the description of the prior art of FIGS. 9 to 12 to avoid repetition of the description.

[First Embodiment (FIG. 1)]

Figure 1:
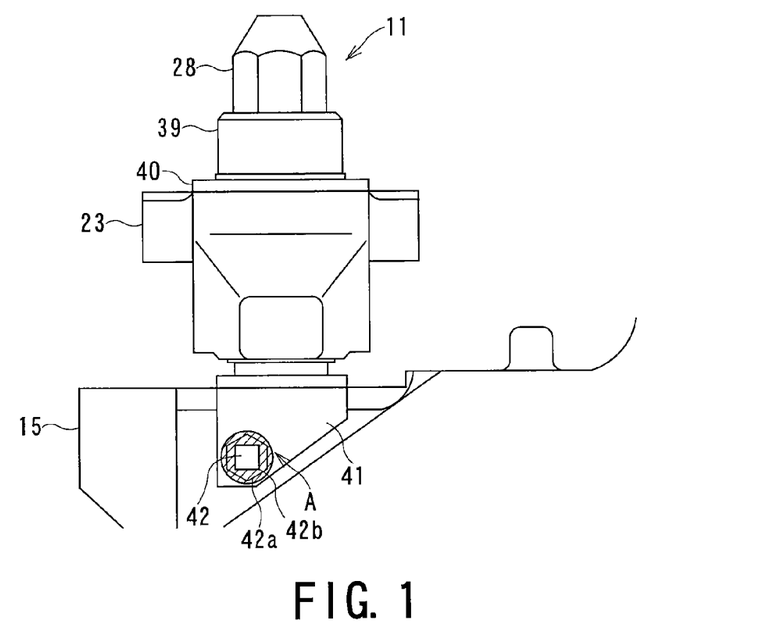
FIG. 1 is a side view showing a cut position in a first embodiment of the present invention.

This embodiment mentions cut positions of a retainer 41 to be removed and a retainer mounting bolt 42 in a method of removing the jet pump retainer. The method includes the steps of cutting the retainer 41 or a retainer mounting bolt 42 for fastening the retainer through an underwater-remote control to remove the retainer mounting bolt 42 and removing the retainer through the underwater-remote control, the retainer 41 being disposed below a jet pump beam 23 of a jet pump 11 arranged in a reactor pressure vessel of a boiling water reactor to circulate cooling water to a reactor core.

FIG. 1 is a side view showing a cut position of the retainer 41 to be removed by the retainer removing method according to the embodiment and the retainer mounting bolt.

As shown in FIG. 1, the retainer 41 is positioned below the jet pump beam 23. The retainer 41 is fastened to the elbow 15 by the retainer mounting bolt 42. Bolt hexagonal side surfaces of the retainer mounting bolt 42 are welded to a side surface of the retainer 41 so as to prevent the bolt 42 from loosening.

FIG. 1 shows a cut area (A) for cutting the welded portion of the retainer mounting bolt 42 by hatching. The cut area (A) includes a portion of the retainer 41 and at least a part of the hexagonal portion 42a of the retainer mounting bolt 42 as shown in the drawing.

In the embodiment, in order to cut the portion of the retainer 41 and the part of the hexagonal portion 42a of the retainer mounting bolt 42 and to turn the bolt separately after the cutting, two or more parallel surfaces of 10 mm to 16 mm are provided. In place of the above cut area (A), it is also possible to cut only the welded portion 42b of the retainer mounting bolt 42.

As a cutting method, various cutting methods including electrical discharge machining, mechanical machining, and the like may be employed.

After the welded portion 42b is cut, the retainer mounting bolt 42 is removed and the retainer 41 is then removed.

[Second Embodiment (FIGS. 2 to 4)]

Figure 2:
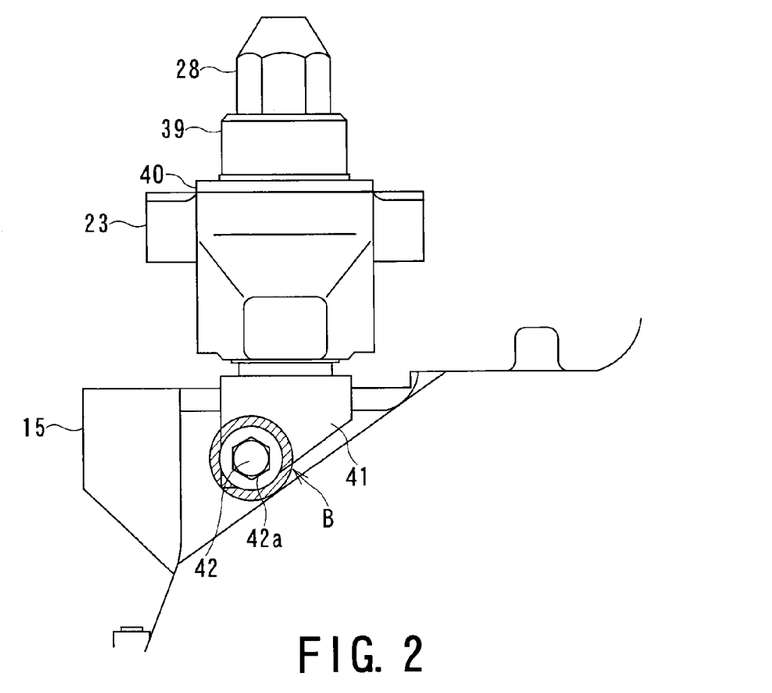
FIG. 2 is a side view showing a cut position in a second embodiment of the invention.

FIG. 2 is a side view showing a cut position of the retainer 41 to be removed by the retainer removing method according to a second embodiment of the invention and the retainer mounting bolt 42.

As shown in FIG. 2, the retainer 41 is positioned below the jet pump beam 23. The retainer 41 is fastened to the elbow 15 by the retainer mounting bolt 42. Bolt hexagonal side surfaces of the retainer mounting bolt 42 are welded to a side surface of the retainer 41 so as to prevent the bolt 42 form loosening.

FIG. 2 shows, with hatching, a cut area (B) for cutting the retainer 41 around the retainer mounting bolt 42. As shown in FIG. 2, this second embodiment is different from the first embodiment in that the welded portion connecting the retainer mounting bolt 42 and the retainer 41 is not removed. By leaving the welded portion unremoved, a flange (flanged portion) is formed around the retainer mounting bolt 42 (in a state with a flange). At this time, a portion constituting the flange around the retainer mounting bolt is cut so as to have such an outside diameter as not to interfere with the elbow 15.

Figure 3:
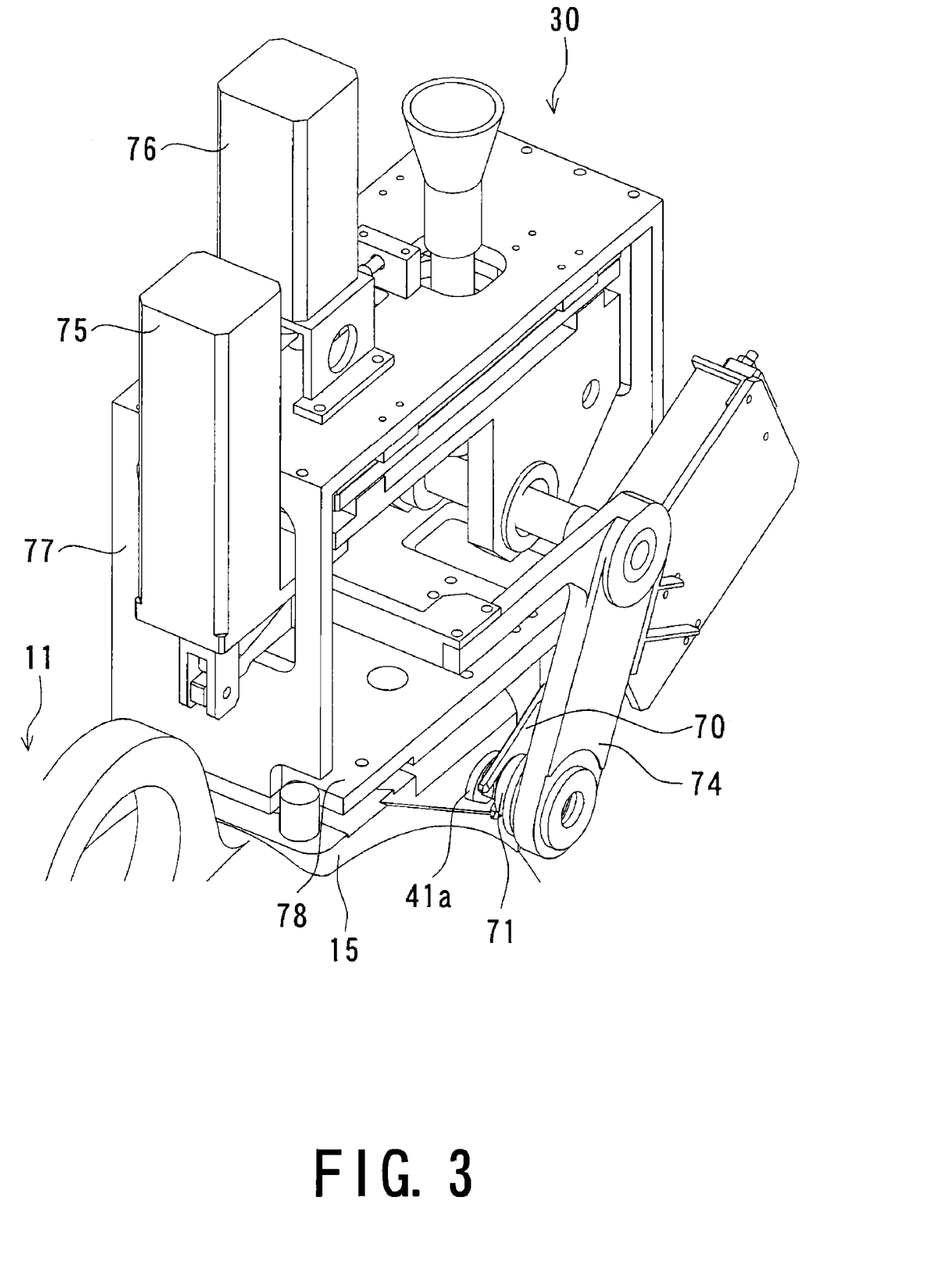
FIG. 3 is a schematic view showing a mounting bolt removing device according to the second embodiment of the invention.

FIG. 3 is a schematic view showing a retainer mounting bolt removing device 30 for removing the retainer 41 after the cutting (cut retainer 41a) and the mounting bolt 42.

As shown in FIG. 3, the retainer mounting bolt removing device 30 includes a frame 77 that can be hung down above the jet pump 11, and a drive portion for vertically driving a wrench portion 75 and a drive portion for laterally driving a wrench portion 76 mounted to the frame 77. A base 78 mounted onto the jet pump 11 is provided below the frame 77 and a bolt retainer 70, a wrench portion 71, and a bolt turning portion retaining portion 74 are provided on a side of the base 78. By operating the respective drive portions, the wrench portion 71 can be moved vertically and laterally and positioned in a bolt removing position at the elbow 15.

Figure 4:
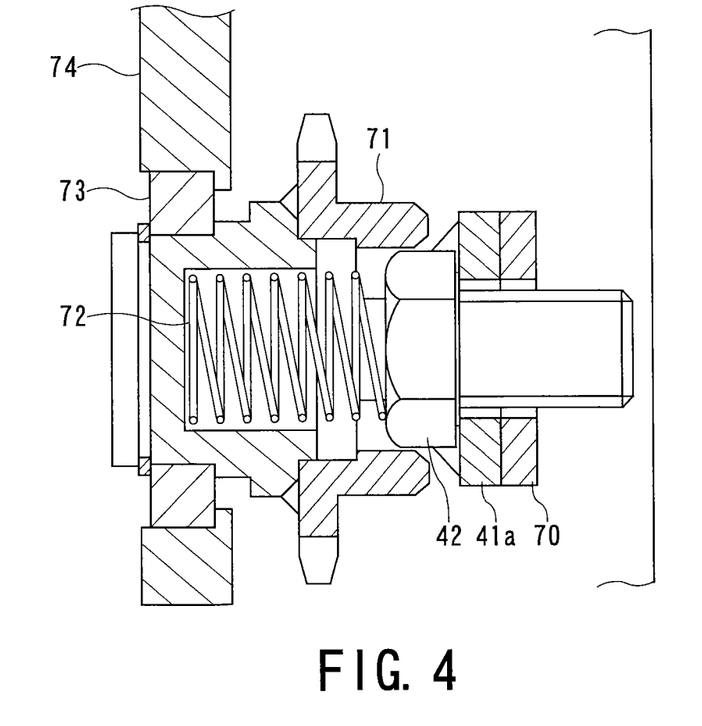
FIG. 4 is an enlarged sectional view of the retainer mounting bolt removing device shown in FIG. 3.

FIG. 4 is an enlarged sectional view of the bolt turning portion retaining portion 74 of the retainer mounting bolt removing device 30 shown in FIG. 3. As shown in FIG. 4, the wrench portion 71 is provided to a tip end of the bolt turning portion retaining portion 74 through a sleeve 73 and a spring (compression coil spring) 72 is also provided.

The wrench portion 71 is engaged with the retainer mounting bolt 42 and the spring 72 is pressed by the retainer mounting bolt 42.

As described above, the retainer mounting bolt 42 and the cut retainer 41a are connected by means of welding. Therefore, after the cutting, the wrench portion 71 of the retainer mounting bolt removing device 30 is set on the bolt hexagonal surface, the retainer mounting bolt 42 is turned slightly to create a clearance between the cut retainer 41a and a side surface of the elbow 15, and the bolt retainer 70 is then inserted into the clearance. In this way, the retainer mounting bolt 42 is pinched between the wrench portion 71 and the bolt retainer 70, and therefore, can be removed without falling down.

After the removal of the retainer mounting bolt 42, the cut retainer 41a is removed.

[Third Embodiment (FIG. 5)]

Figure 5:
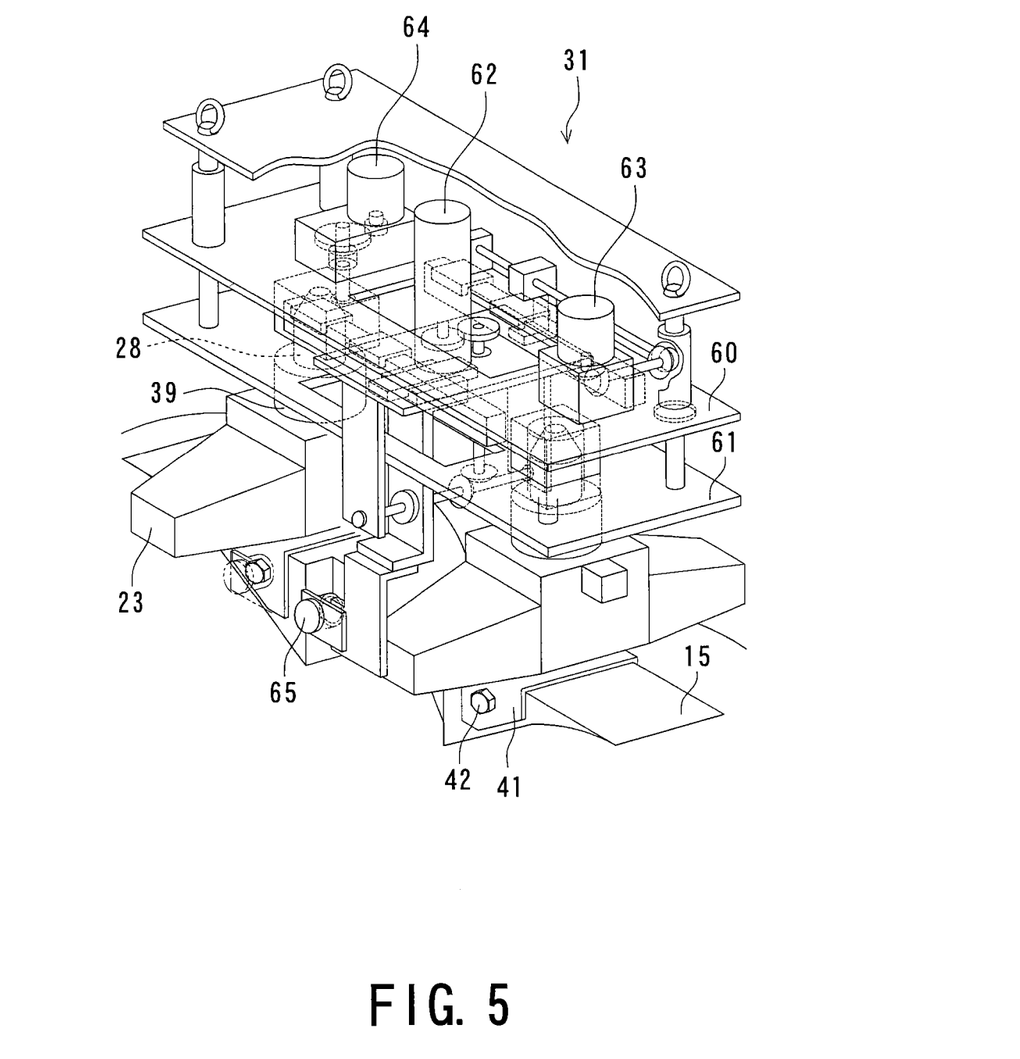
FIG. 5 is a schematic view showing a bolt cutting device according to a third embodiment of the invention.

FIG. 5 is a schematic view showing a bolt cutting device 31 for cutting the retainer 41 or the retainer mounting bolt 42 in the reactor pressure vessel 1.

As shown in FIG. 5, the bolt cutting device 31 includes a drive motor for laterally driving a processing (working) portion 63 and a drive motor for forward-backward driving a processing portion 62 provided to an upper plate 60, and a mounted processing portion 65 is movable longitudinally and laterally. Moreover, an upper plate vertical drive motor 64 is provided to a positioning plate 61 and the mounted positioning plate 61 is movable vertically.

The bolt cutting device 31 is disposed on the jet pump beams 23 by using the head bolts 28 screwed into the jet pump beams 23 disposed in the reactor as guide portions as shown in the drawing. After the disposition, the processing portion 65 of the bolt cutting device 31 is moved to a position of the retainer mounting bolt 42 to be subjected to processing by the respective drive motors, i.e., the processing portion forward-backward drive motor 62, the processing portion lateral drive motor 63, and the upper plate vertical drive motor 64 to carry out the processing of the turn-stop of the retainer mounting bolt 42 or the retainer 41.

After the processing, the bolt cutting device 31 is removed. Thereafter, the retainer mounting bolt 42 is removed and the retainer 41 is then removed.

[Fourth Embodiment (FIG. 6)]

Figure 6:
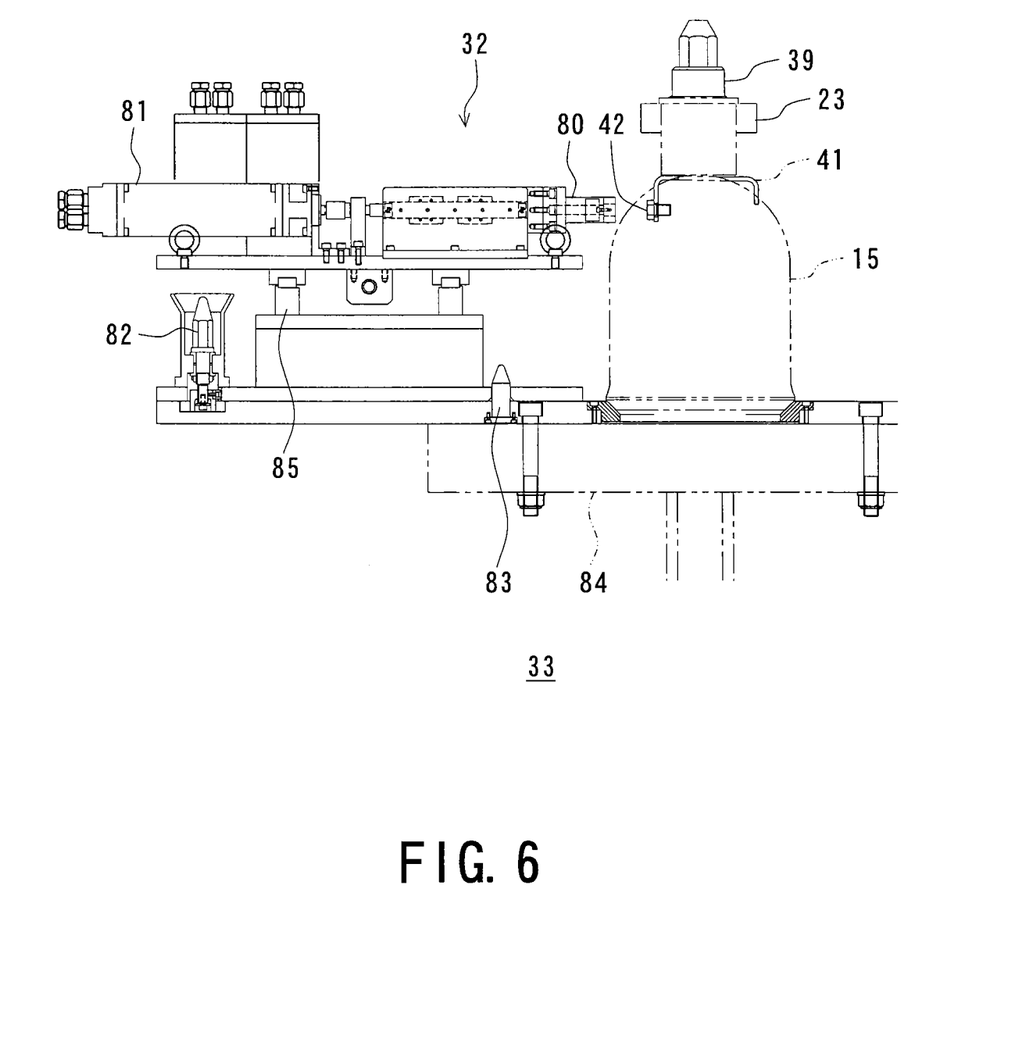
FIG. 6 is a schematic view showing a cutting device in a fourth embodiment of the invention.

FIG. 6 is a schematic view showing a cutting device 32 for cutting the retainer 41 or the retainer mounting bolt 42 in a pool 33.

As shown in FIG. 6, the cutting device 32 is structured to be able to operate a processing portion 80 forward and backward by a processing portion forward-backward drive motor 81. Moreover, the cutting device 32 is operated upward and downward by a drive mechanism for vertically driving a processing device 82, and the processing portion 80 of the cutting device 32 is operated leftward and rightward by guide rails 85.

The inlet mixer 51 is removed from the reactor pressure vessel 1 and disposed on a temporary placement table 84 disposed in the pool 33 as shown in the drawing. After the inlet mixer 51 and the elbow 15 are placed on the temporary placement table 84, the cutting device 32 is mounted thereon by using a positioning pin 83 as a guide. After the placement, the processing portion 80 is moved to a position of the retainer mounting bolt 42 to be processed by the respective drive mechanisms to carry out the turn-stop processing of the retainer mounting bolt 42 or the retainer 41.

After the processing, the cutting device 32 is removed. Then, the retainer mounting bolt 42 is removed and the retainer 41 is removed.

[Fifth Embodiment (FIG. 7)]

Figure 7:
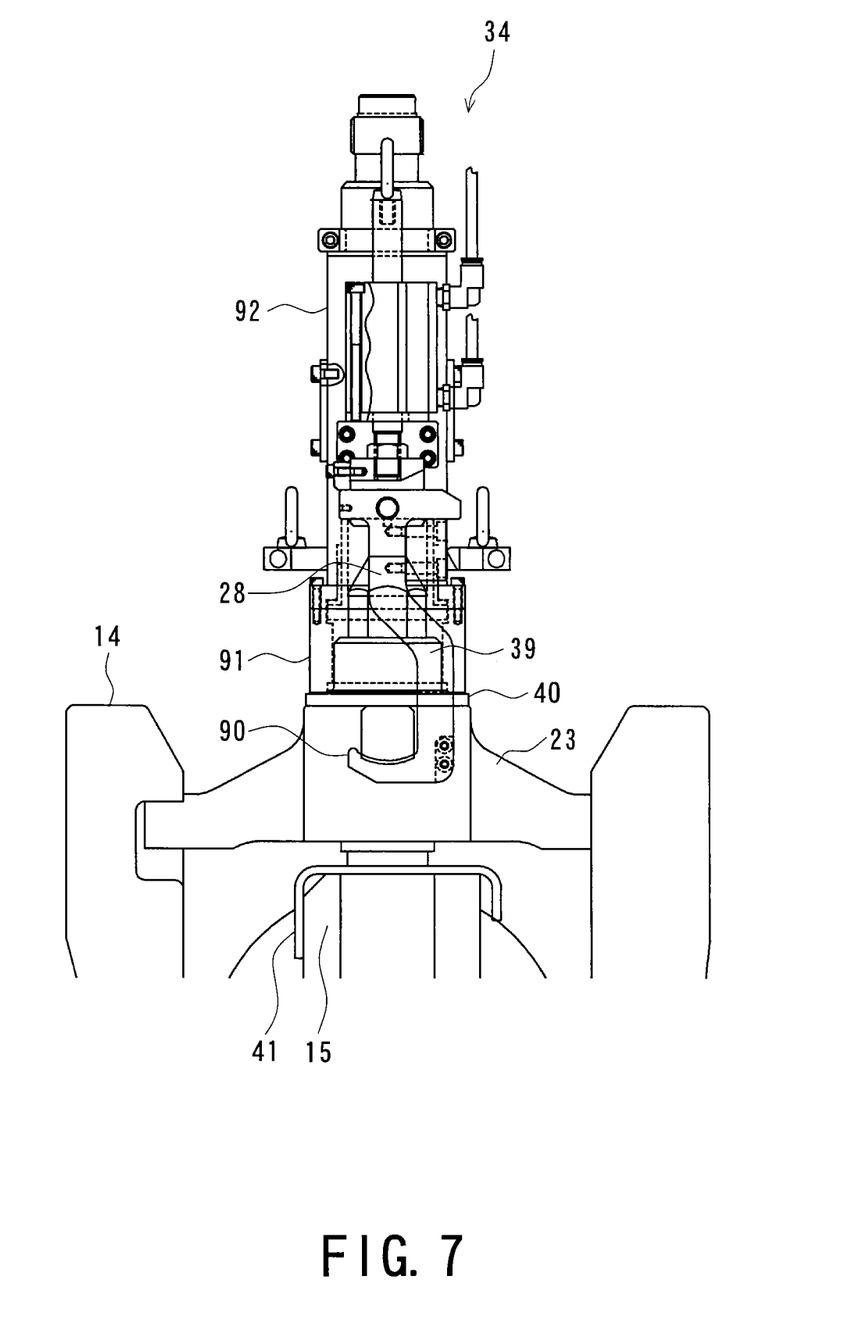
FIG. 7 is a schematic view showing a retainer handling device in a fifth embodiment of the invention.

FIG. 7 is a schematic view showing a retainer handling device 34 for handling the retainer 41 from which the retainer mounting bolt 42 has been removed as well as the jet pump beam 23 and the head bolt 28 screwed into the jet pump beam 23.

As shown in FIG. 7, the retainer handling device 34 grasps a protrusion of the jet pump beam 23 with a hook 90 and a sleeve 91.

Moreover, a turning mechanism 92 is provided in the sleeve 91 and the turning mechanism 92 is turned separately from the sleeve 91. Furthermore, the turning mechanism 92 has a shape capable of being engaged with the hexagonal surface of the head bolt 28. By turning an upper portion of the turning mechanism 92, it is possible to turn the head bolt 28 screwed into the jet pump beam 23 while grasping the jet pump beam 23.

By grasping the jet pump beam 23 with the retainer handling device 34 and turning the turning mechanism portion 92 after the retainer mounting bolt 42 is removed, it is possible to pinch the retainer 41 between a lower portion of the head bolt 28 and a lower surface of the beam to handle the retainer 41 together with the jet pump beam 23.

Figure 8:
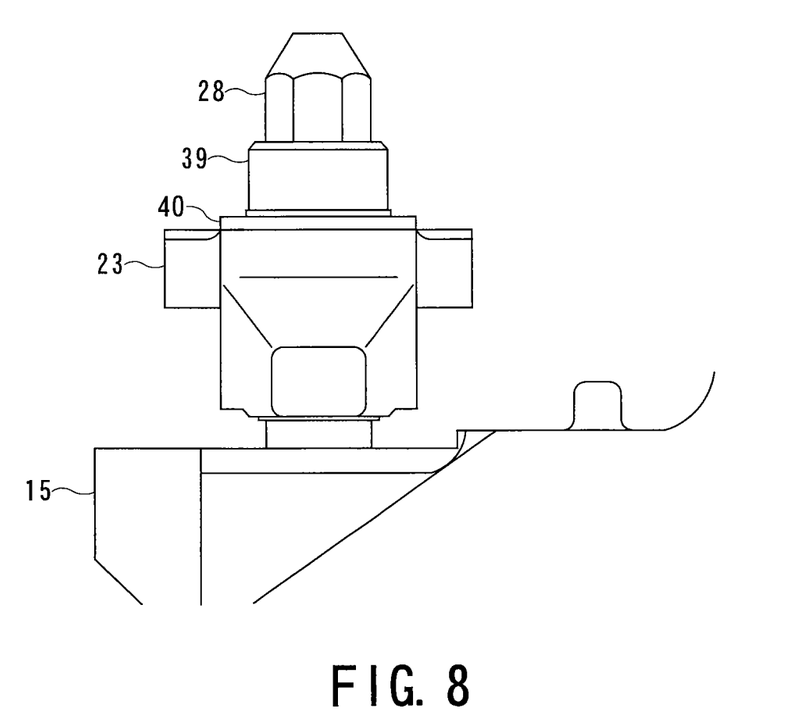
FIG. 8 is a view showing a structure of a relevant portion of a jet pump after removal of a retainer by a retainer removing method of the invention.

FIG. 8 is a view showing a structure of a jet pump after a retainer is removed according to another embodiment of the present invention. More specifically, in each of the above embodiments, the jet pump is provided in the reactor pressure vessel of the boiling water reactor to circulate the cooling water to the reactor core. The jet pump includes the riser, the diffusers, and the inlet mixers positioned between the riser and the diffusers and has retainers each disposed for handling the jet pump beam and the head bolt for connecting the inlet mixer and the riser by fastening means as an integral body with the inlet mixer. The drawing shows a structure of the jet pump after the retainer provided below the pump beam of the jet pump or the bolt for fastening the retainer is cut through the underwater-remote control to remove the bolt. The retainer is then removed through the underwater-remote control.

According to the above embodiments, it is possible to efficiently remove the retainer 41 provided below the jet pump beam 23 of the jet pump 11 through the underwater-remote control by cutting the retainer 41 or the retainer mounting bolt 42 fastening the retainer 41 and removing the retainer mounting bolt 42 under the underwater-remote control.

Moreover, it is possible to easily remove the retainer 41 through the underwater-remote control after cutting the whole or a part of the retainer mounting bolt 42 through the underwater-remote control and removing the retainer mounting bolt 42.

Furthermore, it is possible to easily remove the retainer 41 in the reactor pressure vessel 1 or to remove the retainer 41 in the pool 33 after taking the inlet mixer 51 out of the reactor pressure vessel 1.

Moreover, it is possible to remove the retainer 41 together with the jet pump beam 23 and the head bolt 28 above the retainer 41.

As a result, recovery work for securing a sufficient function of the jet pump 11 can be carried out easily and also the retainer 41 can be removed under such an environment that sufficient shielding effect of water is achieved in order to minimize exposure of a worker to radiation.

What is claimed is:

1. A method of removing a jet pump disposed in a reactor pressure vessel of a boiling water reactor and configured to circulate a circulation cooling water, comprising the steps of: annularly cutting a peripheral portion of a retainer-mounting bolt, except a welded portion between the bolt and a retainer, in which the retainer connects a pump beam of the jet pump to an elbow portion and the bolt fastens the retainer to the elbow portion; rotating and loosening the bolt; removing the bolt, thereafter inserting a bolt retainer for preventing the retainer from falling down between the retainer and the elbow; rotating a head bolt mounted on the pump beam to thereby insert the retainer between a lower portion of the head bolt and a lower surface of the pump beam to thereby closely fasten the retainer to the pump beam and holding the retainer; taking out the pump beam together with the retainer to the outside of the reactor pressure vessel; and removing the retainer from the pump beam through an underwater remote control.

* * * * *